US012806502B2

(12) United States Patent
Hemberger et al.

(10) Patent No.: US 12,806,502 B2
(45) **Date of Patent: *Nov. 24, 2026**

(54) SCORING METHOD AND SYSTEM

(71) Applicant: Caddie Snap, LLC, Covington, KY (US)

(72) Inventors: Matthew B. Hemberger, Covington, KY (US); Benjamin P. Schmidlin, Cincinnati, OH (US); Amanuel A. Tsegai, Cincinnati, OH (US)

(73) Assignee: Caddie Snap, LLC, Covington, KY (US)

( * ) Notice: Subject to any disclaimer, the term of this patent is extended or adjusted under 35 U.S.C. 154(b) by 167 days.

This patent is subject to a terminal disclaimer.

(21) Appl. No.: 18/764,481

(22) Filed: Jul. 5, 2024

(65) Prior Publication Data

US 2025/0032887 A1 Jan. 30, 2025

Related U.S. Application Data

(63) Continuation of application No. 17/176,258, filed on Feb. 16, 2021, now Pat. No. 12,029,963.

(51) Int. Cl.

| | |
|---|---|
| ***A63B 71/06*** | (2006.01) |
| ***G06V 30/148*** | (2022.01) |
| ***G06V 30/222*** | (2022.01) |
| *A63B 102/32* | (2015.01) |

(52) U.S. Cl.

CPC ........ *A63B 71/0669* (2013.01); *G06V 30/153* (2022.01); *G06V 30/155* (2022.01); *G06V 30/222* (2022.01); *A63B 71/0619* (2013.01); *A63B 2102/32* (2015.10); *A63B 2225/20* (2013.01)

(58) Field of Classification Search

None

See application file for complete search history.

(56) References Cited

U.S. PATENT DOCUMENTS

| | | | | |
|---|---|---|---|---|
| 5,795,237 | A * | 8/1998 | Miyamoto | A63B 71/06 473/409 |
| 6,062,991 | A * | 5/2000 | Moriarty | A63B 71/0669 473/409 |
| 8,064,700 | B2 * | 11/2011 | King | G06Q 30/02 345/468 |

(Continued)

*Primary Examiner* — Sunit Pandya

(74) *Attorney, Agent, or Firm* — FBT Gibbons LLP

(57) ABSTRACT

A method to score a round of golf using a golf scoring system. The method includes capturing a photograph of a physical scorecard including handwritten text using a camera of a user device, wherein the physical scorecard includes handwritten characters disposed at least partially within rectilinear boxes. The method also includes accessing the photograph in an application of the user device. The method also includes identifying the rectilinear boxes by using a color contrast between the rectilinear boxes of the physical scorecard and a background color of the physical scorecard. The method also includes removing the rectilinear boxes. The method also includes after removing the rectilinear boxes, extracting at least the handwritten characters from the physical scorecard. The method also includes after extracting at least the handwritten characters, calculating a score of the round of golf using the extracted handwritten characters on the application.

20 Claims, 14 Drawing Sheets

(56) References Cited

U.S. PATENT DOCUMENTS

| | | | | |
|---|---|---|---|---|
| 8,081,849 | B2 * | 12/2011 | King | G06V 30/142<br>382/307 |
| 8,214,387 | B2 * | 7/2012 | King | G06Q 20/4012<br>358/448 |
| 8,442,331 | B2 * | 5/2013 | King | G06Q 20/102<br>382/229 |
| 8,619,147 | B2 * | 12/2013 | King | H04N 1/00363<br>348/210.99 |
| 9,561,423 | B2 * | 2/2017 | Roness | G06C 3/00 |
| 9,697,540 | B2 * | 7/2017 | Bonito | A63B 71/06 |
| 2002/0191847 | A1 * | 12/2002 | Newman | G06V 30/1444<br>382/176 |
| 2006/0204111 | A1 * | 9/2006 | Koshi | G06F 40/58<br>382/229 |
| 2013/0234842 | A1 * | 9/2013 | Leitz | H04M 1/72427<br>340/323 R |

* cited by examiner

SCORING METHOD AND SYSTEM

REFERENCE TO RELATED APPLICATIONS

This application is a continuation of U.S. application Ser. No. 17/176,258, filed Feb. 16, 2021, entitled "Scoring Method and System," the disclosure of which is incorporated by reference herein.

BACKGROUND

Handwritten characters disposed within rectilinear boxes are difficult to accurately ascertain using optical character recognition (OCR) software. OCR software may recognize the characters disposed within the rectilinear boxes, and use the rectilinear boxes to separate the characters. However, a problem exists when the handwritten characters are written at least partially on top of the rectilinear boxes. When characters are written on top of the rectilinear boxes or at least partially inside an adjacent rectilinear box, it becomes difficult to produce an accurate analysis which may result in OCR errors. Moreover, calculating a series of handwritten numbers may amplify the problem and cause incorrect calculations of the series of handwritten numbers. As a result, it would be desirable to accurately ascertain a series of handwritten text disposed within rectilinear boxes, without incorrect identifications.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
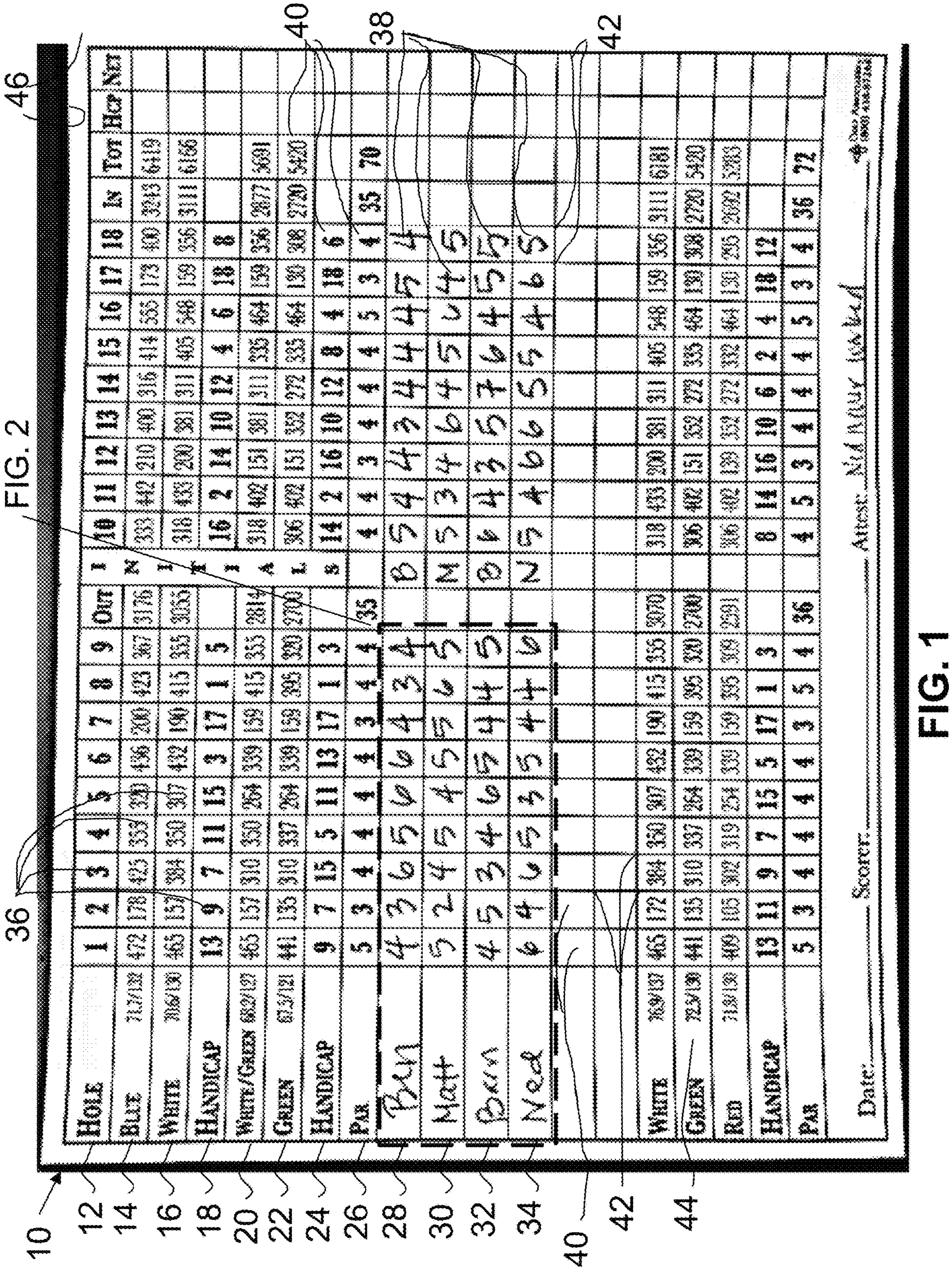
FIG. 1 depicts a top plan view of a physical scorecard that includes printed and handwritten characters disposed within rectilinear boxes.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Exemplary Scoring System

A. Physical Scorecard

Physical scorecard (10) may include a plurality of rows and a plurality of columns arranged in a grid pattern. As shown in FIG. 1, the preprinted rows include hole number (12), blue tee yardage (14), white tee yardage (16), handicap (18), white/green tee yardage (20), green tee yardage (22), handicap (24), par (26), among others. The content of these preprinted rows may vary, such that rows may be added or removed.

Figure 2:
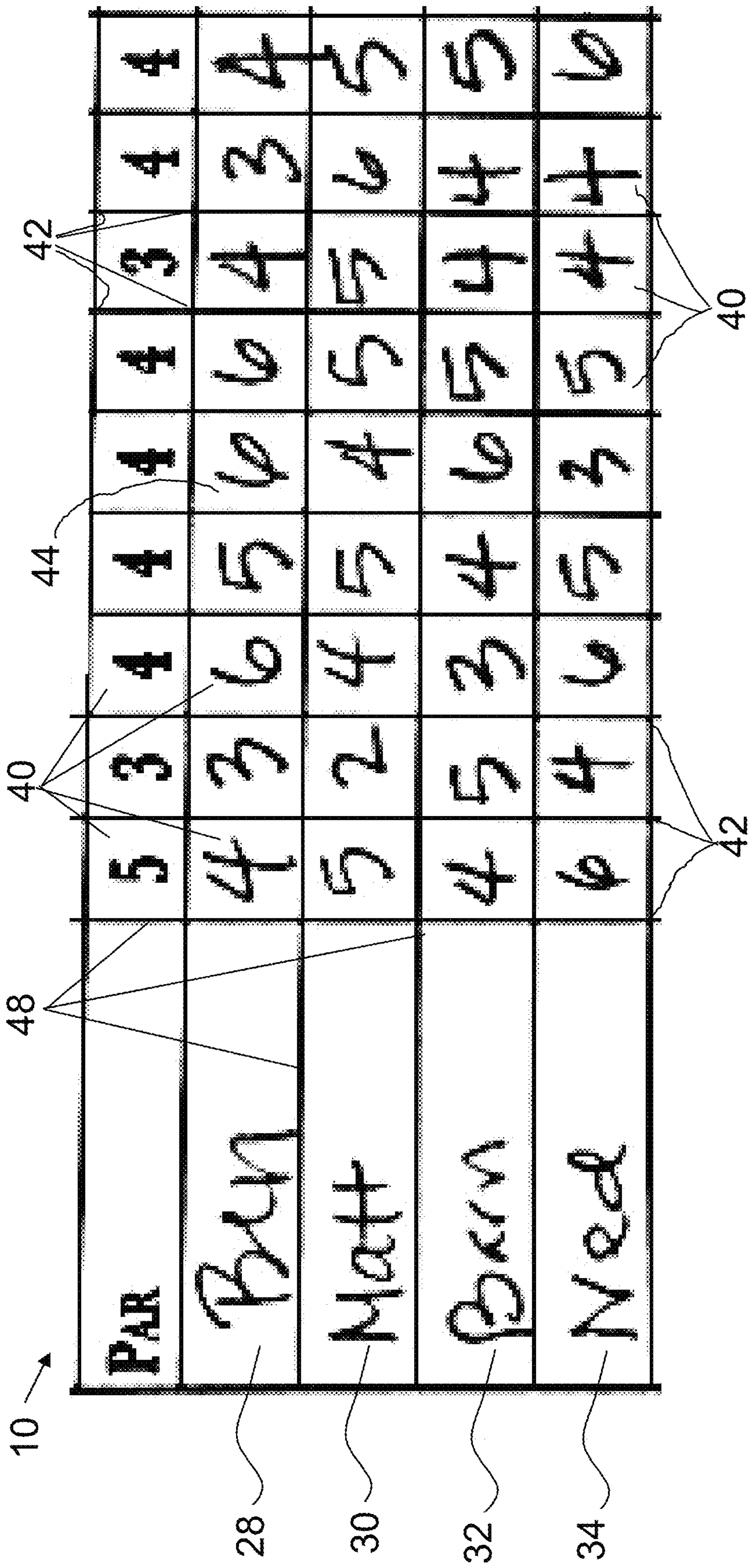
FIG. 2 depicts a top plan view of enlarged portion "FIG. 2" of FIG. 1.

Handwritten rows include name and individual hole scores of player 1 (28), name and individual hole scores of player 2 (30), name and individual hole scores of player 3 (32), and name and score of player 4 (34). Additional handwritten rows appear below name of player 4 (34) allow for names and individual hole scores of additional players (not shown). FIG. 1 shows a top plan view of a physical scorecard (10) that includes both printed characters (36) and handwritten characters (38) disposed at least partially within rectilinear boxes (40). Physical scorecard (10) is shown as having a white background (44); however, this background color may vary as long as background (44) contrasts printed characters (36) and handwritten characters (38). Physical scorecard (10) includes an outer periphery (46) defining the outermost edges of physical scorecard (10). FIG. 2 shows a top plan view of enlarged portion "FIG. 2" of FIG. 1. As shown in FIG. 2, rectilinear boxes (40) are formed by straight lines (48) that intersect at right angles (42).

Physical scorecard (10) allows for individual hole scores to be recorded while playing without having to carry and use a separate device while playing. For example, physical scorecard (10) may prevent a player from having to retrieve their telephone or other scoring device while playing. Regarding mobile device, it may be less desirable for the player to retrieve the mobile device, unlock the mobile device, manually enter the player's score for the individual hole, lock the mobile device, and secure the mobile device. This process may have to be repeated for each hole. Additionally, since golf is a social game, it may be undesirable to repeatedly interact with the mobile device while playing a round of golf. While using physical scorecard (10) is desirable for at least this reason, the players may have to mentally calculate the scores of the players in their head (e.g., at the end of the round of golf) which takes time and allows for reporting incorrect information (e.g., on leaderboards). As a result, there is a need to use the physical scorecards without having the problems associated with mentally scoring handwritten scorecards. Thus, there is a need in the art to allow the user to score physical scorecard (40) in a straightforward and easy to use manner using scoring system (100), which is described below with reference to the following figures.

B. Exemplary Computing System

Figure 3:
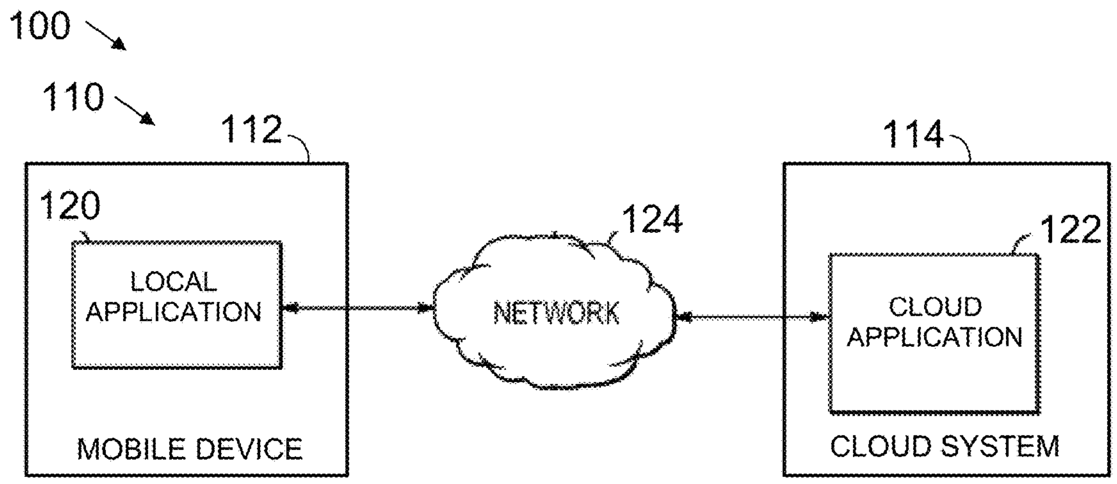
FIG. 3 depicts a diagrammatic view of an exemplary scoring system.

Referring now to FIG. 3, a scoring system (100) of the present invention may include an operating environment (110). In general, scoring system (100) operates to capture, process to remove rectilinear boxes (40), and score physical scorecard (10) after removing rectilinear boxes (40). Scoring system (100) allows players to calculate scores with ease and speed. Scoring system (100) includes at least physical scorecard (10) and a user system. While user system is shown and described a mobile device (112), other suitable user systems are also envisioned including a computer system. As used herein, a "mobile device" is a portable electronic device that includes a camera and may connect to the internet, and is expressly intended to include smartphones (e.g., iPhones) and tablet computers (e.g., iPods and iPads) from various manufacturers and of different shapes and sizes, as well as other portable electronic devices that include a camera and may connect to the internet. In some versions, scoring system (100) may include a cloud-based application (122) existing in a cloud system (114). A network (124) may connect local application (120) with cloud-based application (122).

Figure 4:
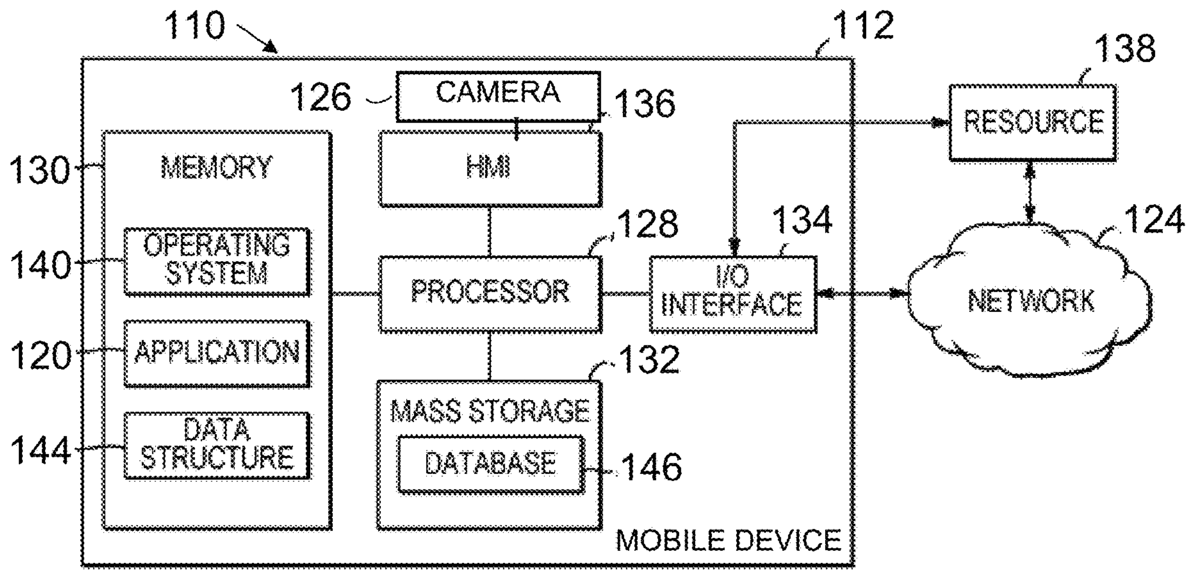
FIG. 4 depicts a diagrammatic view of an exemplary database system of the scoring system of FIG. 3.

FIG. 3 shows a diagrammatic view of an exemplary scoring system (100), and FIG. 4 shows a diagrammatic view of an exemplary database system of the scoring system (100) of FIG. 3. Referring now to FIG. 3, mobile device (112), cloud system (114), and network (124) of operating environment (110) may be implemented on one or more computing devices or systems. Aspects of scoring system (100) may be compatible with web applications and desktop applications. Mobile device (112) may include a local application (120), a camera (126), a processor (128), a memory (130), a mass storage memory device (132), an input/output (I/O) interface (134), and a Human Machine Interface (HMI) (136). Mobile device (112) may be operatively coupled to one or more external resources (138) via network (124) or I/O interface (134). External resource (138) may include, but are not limited to, servers, databases, mass storage devices, peripheral devices, cloud-based network services, scanners, or any other suitable computer resource that may used by mobile device (112). In some versions, external resource (138) may include a scanner when a plurality of scorecards are to be scored.

Processor (128) may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory (130). Memory (130) may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. Mass storage memory device (132) may include data storage devices such as a hard drive, optical drive, tape drive, non-volatile solid-state device, or any other device capable of storing information.

Processor (128) may operate under the control of an operating system (140) that resides in memory (130). Operating system (140) may manage computer resources so that computer program code embodied as one or more computer software applications, such as local application (120) residing in memory (130), may have instructions executed by processor (128). In an alternative embodiment, processor (128) may execute local application (120) directly, in which case, operating system (140) may be omitted. One or more data structures (144) may also reside in memory (130), and may be used by processor (128), operating system (140), or local application (120) to store or manipulate data.

I/O interface (134) may provide a machine interface that operatively couples processor (128) to other devices and systems, such as network (124) or external resource (138). Local application (120) may thereby work cooperatively with network (124) or external resource (138) by communicating via I/O interface (134) to provide the various features, functions, applications, processes, or modules comprising embodiments of the invention. Local application (120) may also have program code that is executed by one or more external resources (138), or otherwise rely on functions or signals provided by other system or network components external to mobile device (112). Indeed, given the nearly endless hardware and software configurations possible, persons having ordinary skill in the art will understand that embodiments of the invention may include applications that are located externally to mobile device (112), distributed among multiple computers or other external resources (138), or provided by computing resources (hardware and software) that are provided as a service over network (124), such as a cloud computing service (e.g., cloud system (114) that includes cloud application (122)).

HMI (136) may be operatively coupled to processor (128) of mobile device (112) in a known manner to allow a user to interact directly with mobile device (112). HMI (136) may include video or alphanumeric displays, a touch screen, a speaker, and any other suitable audio and visual indicators capable of providing data to the user. HMI (136) may also include input devices and controls such as an alphanumeric keyboard, a pointing device, keypads, pushbuttons, control knobs, microphones, etc., capable of accepting commands or input from the user and transmitting the entered input to processor (128).

A database (146) may reside on mass storage memory device (132), and may be used to collect and organize data used by the various systems and modules described herein. Database (146) may include data and supporting data structures that store and organize the data. In particular, database (146) may be arranged with any database organization or structure including, but not limited to, a relational database, a hierarchical database, a network database, or combinations thereof. A database management system in the form of a computer software application executing as instructions on processor (128) may be used to access the information or data stored in records of database (146) in response to a query, where a query may be dynamically determined and executed by operating system (140), other local applications (120), or one or more modules.

Exemplary Method

Figure 5A:
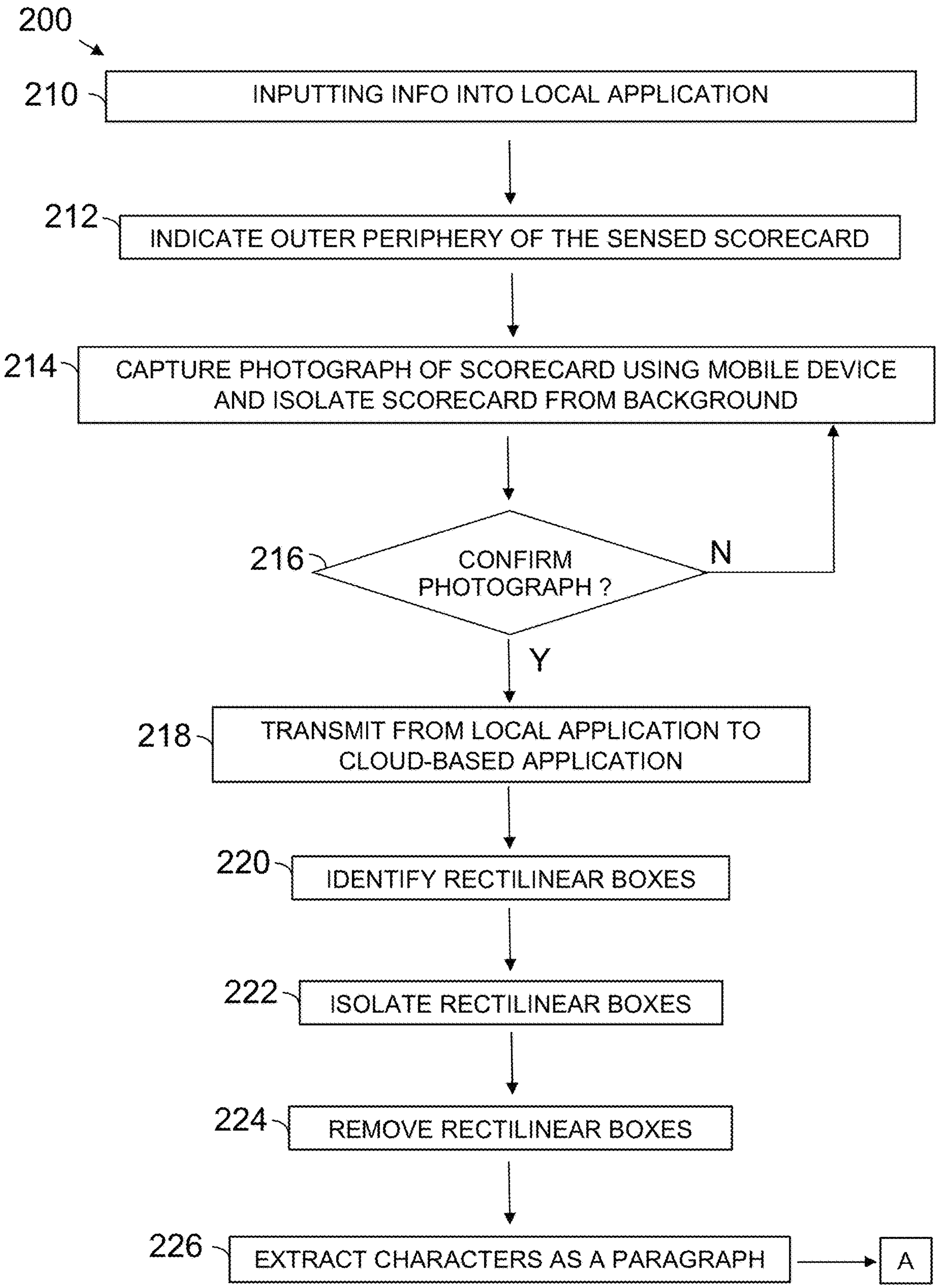
FIG. 5A depicts a flowchart of an exemplary method for scoring a physical scorecard that includes handwritten characters using the scoring system of FIG. 3.
Figure 5B:
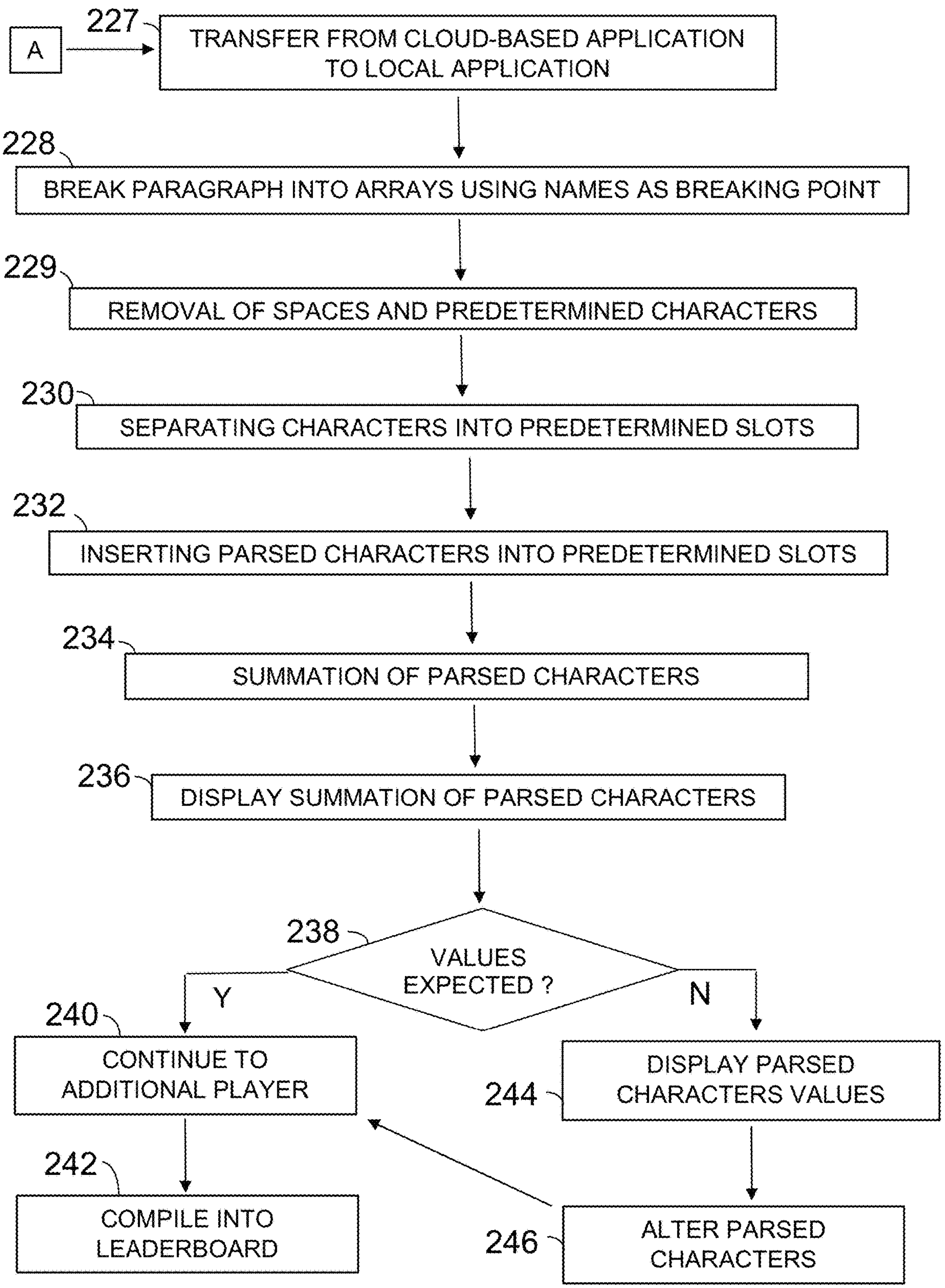
FIG. 5B depicts a flowchart of an exemplary method for scoring the physical scorecard that includes handwritten characters using the scoring system of FIG. 3.

FIG. 5A-5B show a flowchart of an exemplary method (200) for scoring physical scorecard (10) using scoring system (100) is described below with reference to the following figures. Method (200) may include steps (210, 212, 214, 216, 218, 220, 222, 224, 226, 227, 228, 229, 230, 232, 234, 236, 238, 240, 242, 244, 246). Physical scorecard (10) that includes printed characters (36) and handwritten characters (38). While the following description pertains to golf scoring, the scoring system (100) may be alternatively used for tabulating logbooks similar in form/format to scorecards. For example, scoring system (100) may be used to scan pilot logbooks or trucker's logbooks.

Figure 6:
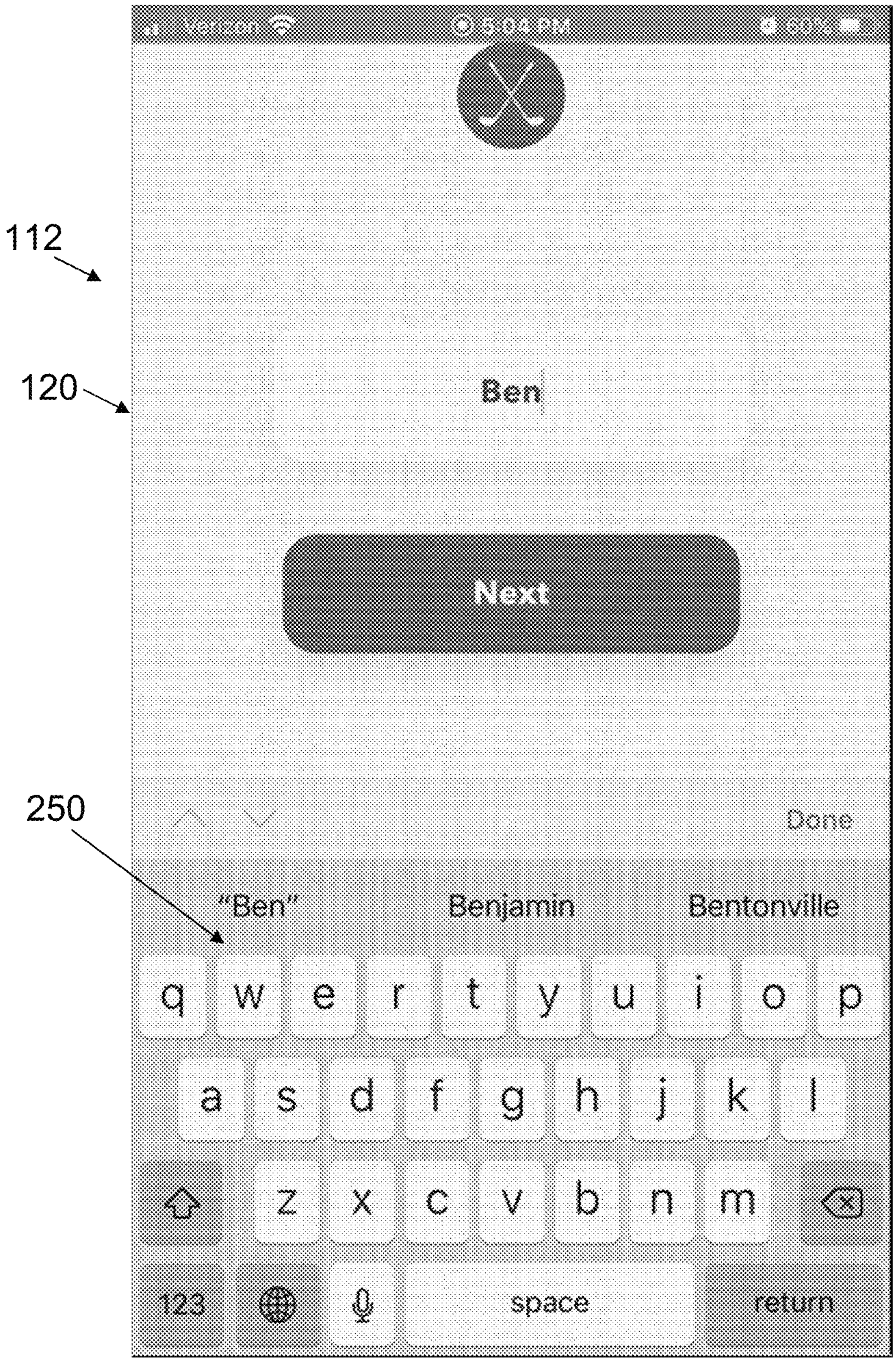
FIG. 6 depicts an interface for inputting characters into an exemplary mobile device-based application of the scoring system of FIG. 3.
Figure 7:
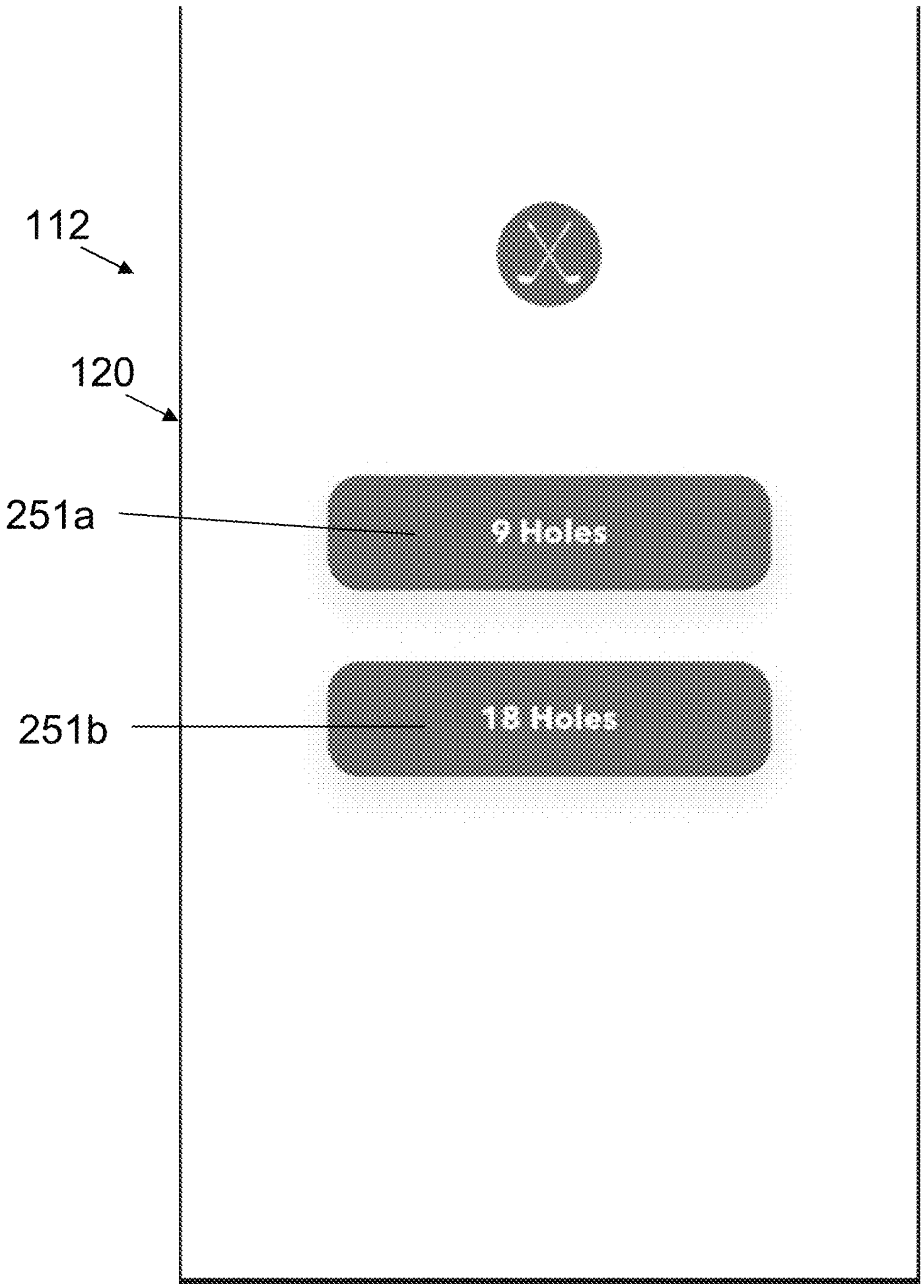
FIG. 7 depicts an interface for inputting the number of holes.

At step (210), method (200) includes entering data into local application (120). For example, these user inputs may include the name of the golfer and the game size. In some versions, game size may refer to the number of golf holes to be played (e.g., 9 holes or 18 holes). This game size selection allows local application (120) to determine how to calculate the numbers on physical scorecard (10). FIGS. 6-7 show interfaces of local application (120) for inputting characters into local application (120) of the scoring system (100) of FIG. 3. Particularly, FIG. 6 shows the interface for manually inputting into local application (120) the name(s) of the player(s) as they appear on physical scorecard (10) prior to capturing a photograph (254) of physical scorecard (10). The at least one player's name may be entered using the electronic keyboard (250) of HMI (136). In some versions, it is envisioned that this step may be omitted, such that local application (120) reads the name(s) directly from physical scorecard (10). FIG. 7 shows the interface for manually inputting into local application (120) the number of holes to be played. As shown, 9 holes (251*a*) or 18 holes (251*b*) may be selected. In some versions, the geographical location of where the game (e.g., golf course) may be an input. For example, users may select the location of their field from a drop down or based on the player's GPS location to detect the field.

Figure 8:
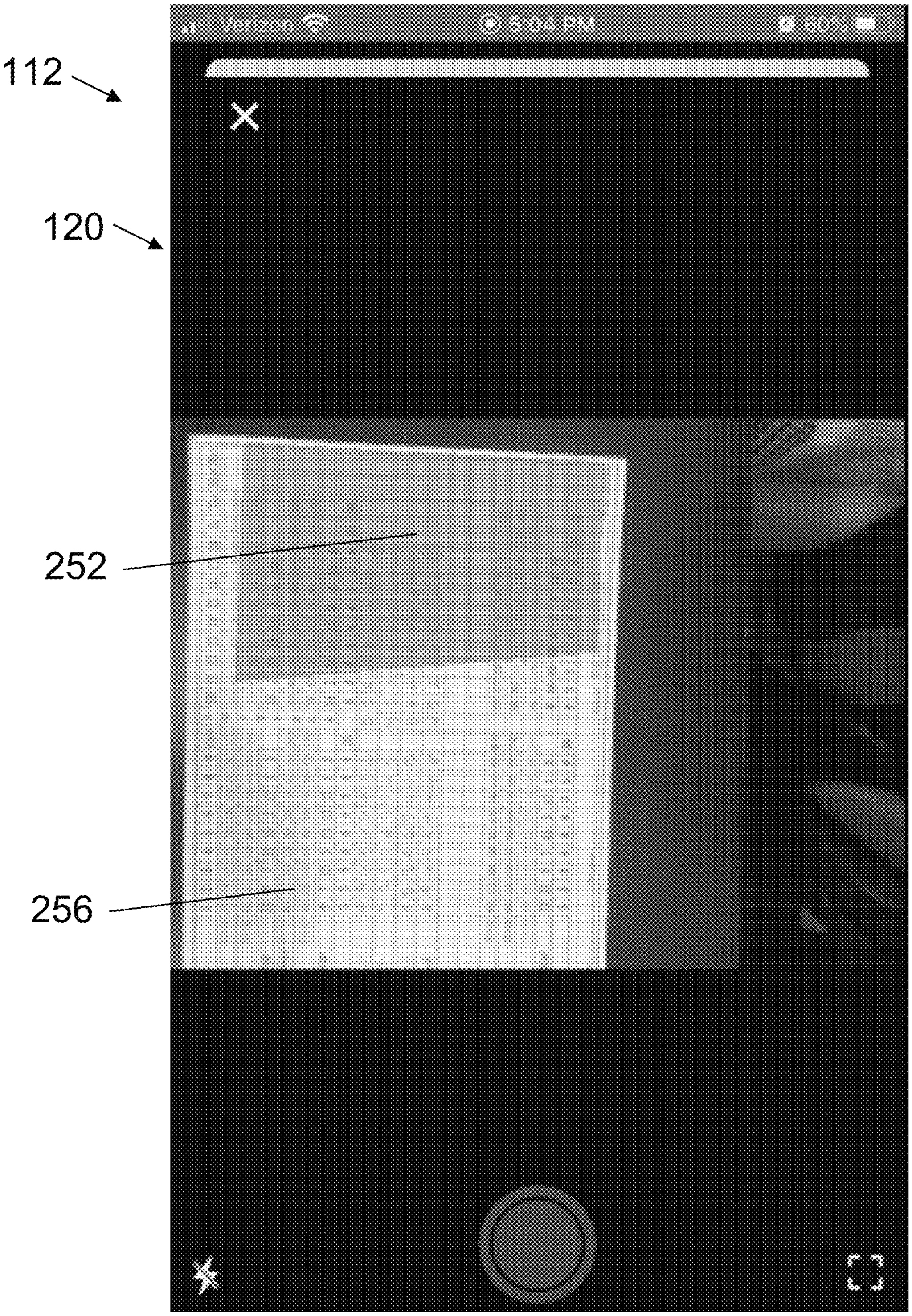
FIG. 8 depicts an interface for indicating an outer periphery of the sensed scorecard when the camera views the scorecard in a first position.
Figure 9:
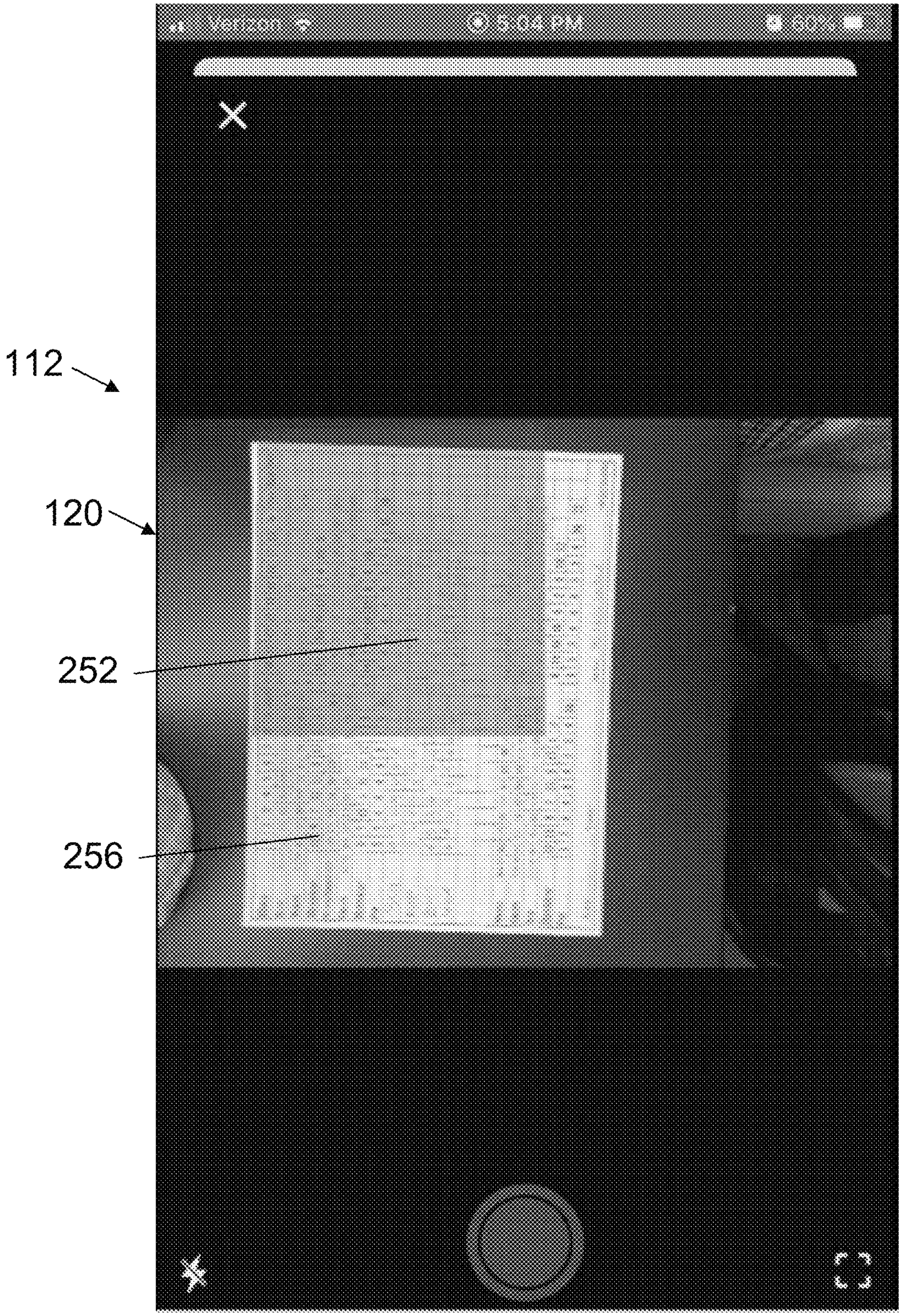
FIG. 9 depicts an interface for indicating the outer periphery of the sensed scorecard when the camera views the scorecard in a second position.
Figure 10:
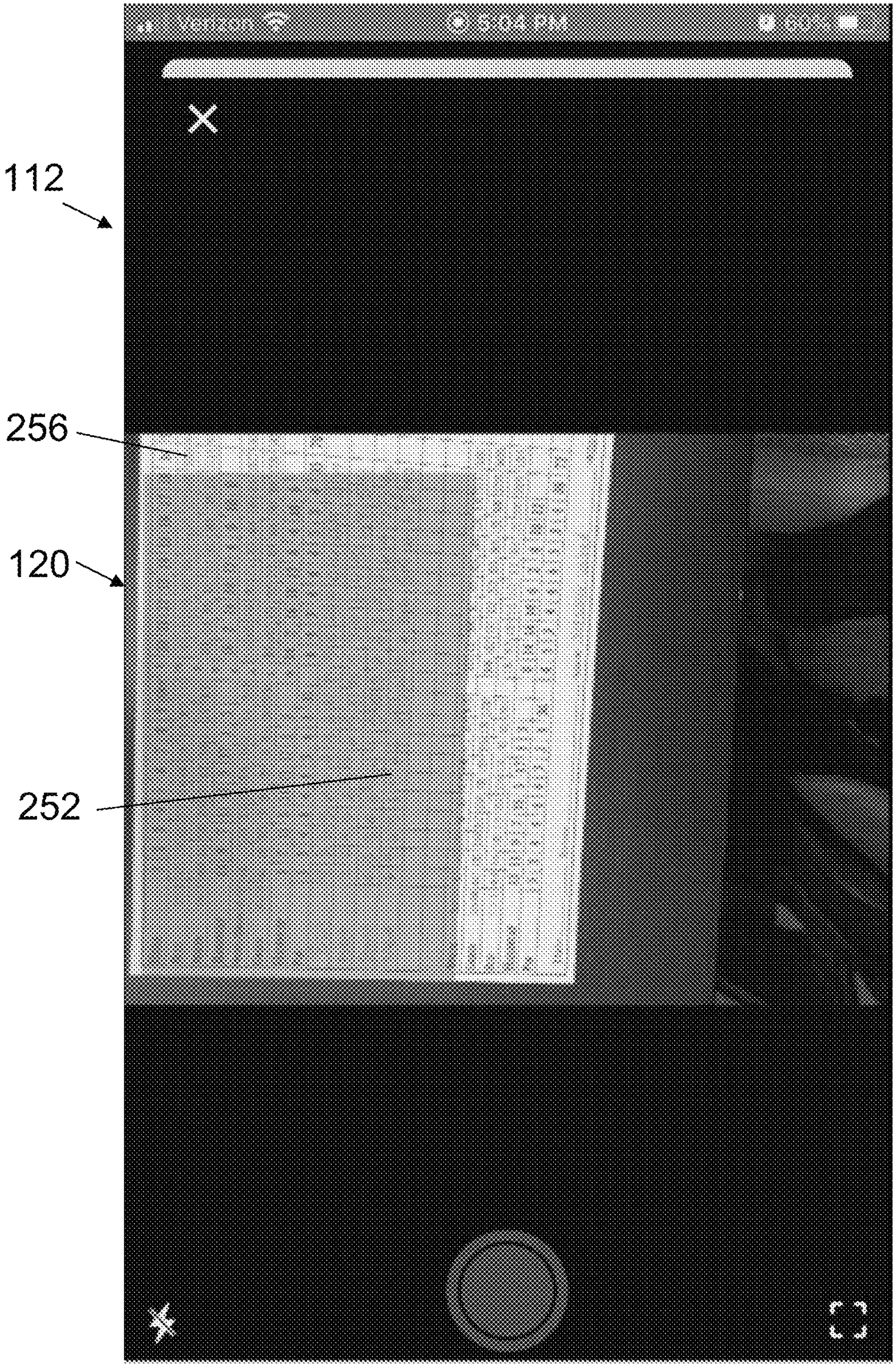
FIG. 10 depicts an interface for indicating the outer periphery of the sensed scorecard when the camera views the scorecard in a third position.
Figure 11:
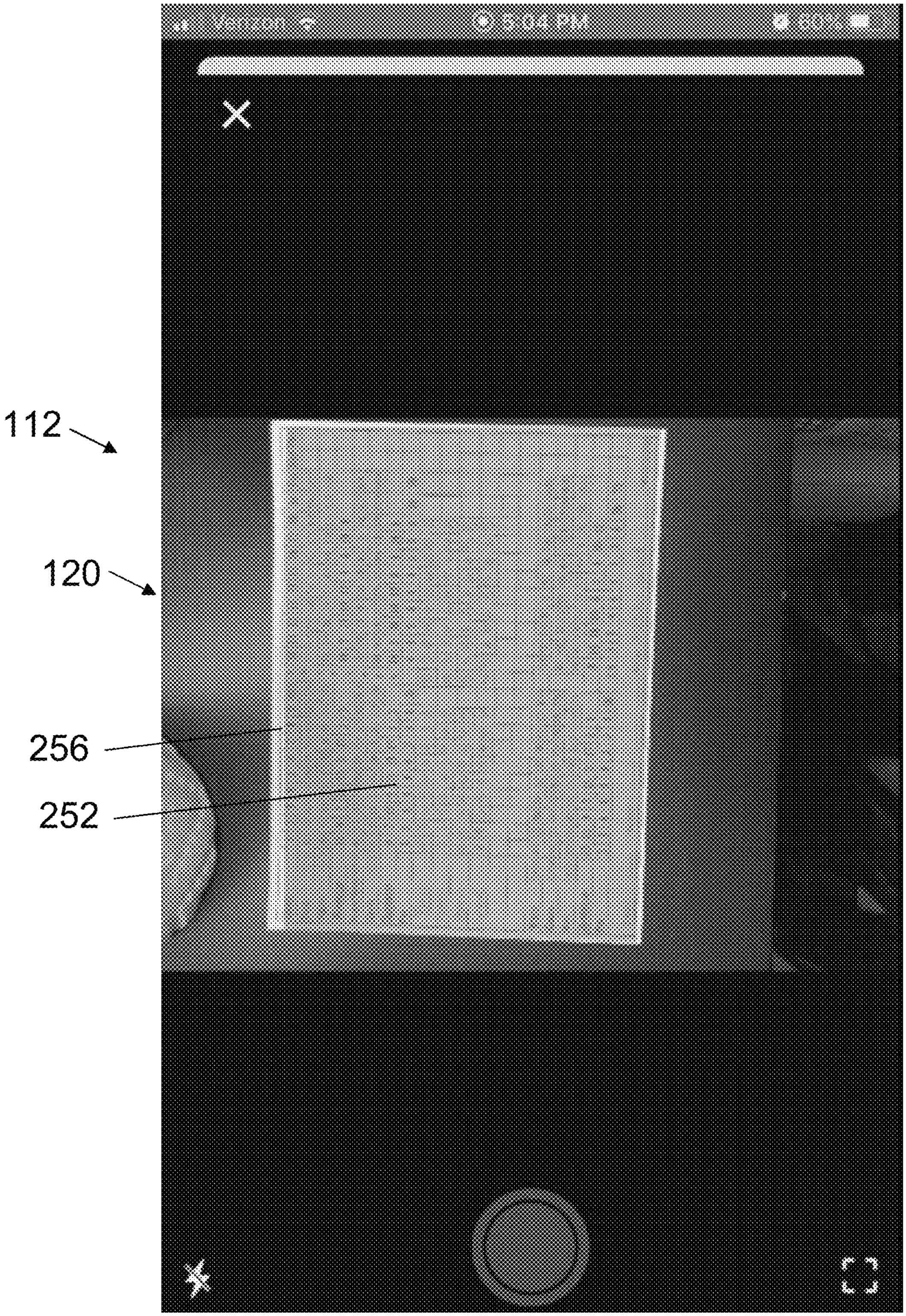
FIG. 11 depicts an interface for indicating the outer periphery of the sensed scorecard when the camera views the scorecard in a fourth position.

At step (212), method (200) includes indicating at least an outer periphery (46) of sensed physical scorecard (10) prior to capturing photograph (254) using a box identification program. A shaded shape, shown as rectangle (252), is overlaid onto sensed physical scorecard (10) to show the target area that will be captured. FIGS. 8-11 respectively show an interface of local application (120) for indicating an outer periphery (46) of sensed physical scorecard (10) when the camera (126) views sensed physical scorecard (10) in different positions. Particularly, FIG. 8 shows when camera (126) views sensed physical scorecard (10) in a first position, FIG. 9 shows when camera (126) views sensed physical scorecard (10) in a second position, and FIG. 10 shows when camera (126) views sensed physical scorecard (10) in a third position. In each of first, second, and third positions, a portion of sensed physical scorecard (10) is omitted from being captured as shown by rectangle (256). However, FIG. 11 shows printed characters (36) and handwritten characters (38) of physical scorecard (10) being overlaid by rectangle (256), such that physical scorecard (10) in its entirety may be captured. Isolation may be used when using the web or desktop-based programs (e.g., boundary drawing program if scanning documents). In some versions, external resource (138) in the form of a scanner may be used.

At step (214), method (200) includes capturing a photograph (258) of physical scorecard (10) including printed characters (36) and handwritten characters (38) of physical scorecard (10) using camera (126) of mobile device (112). Local application (120) may simultaneously isolate physical scorecard (10) from the remaining captured aspects outside outer periphery (46) of physical scorecard (10). For example, local application (120) may use a model trained on previously identified outer peripheries of other physical scorecards to identify outer periphery (46) of physical scorecard (10). This reduces the likelihood of capturing extraneous information that may slow down or otherwise affect scoring system (100).

Figure 12:
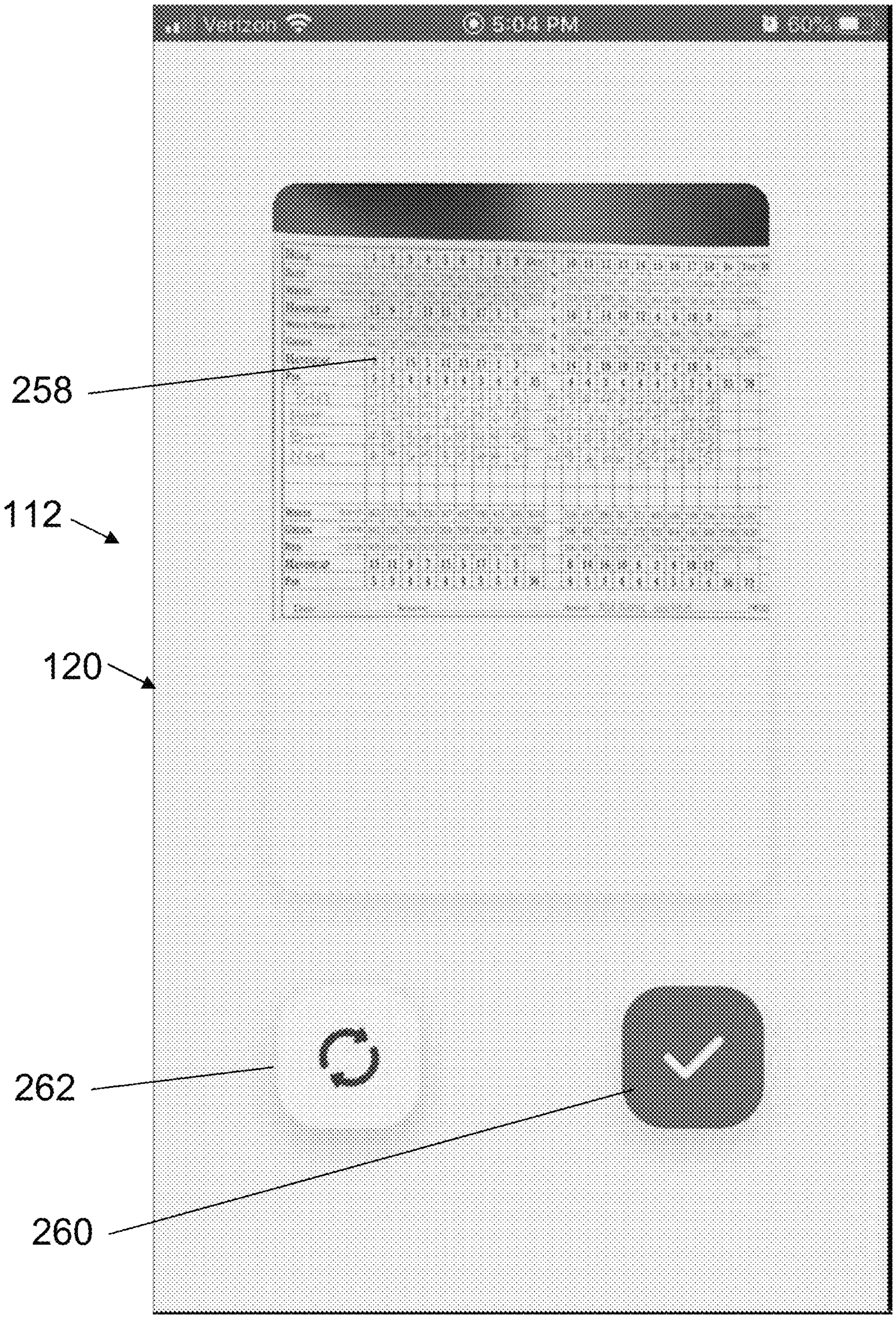
FIG. 12 depicts an interface for displaying the captured photograph of the physical scorecard.

At step (216), method (200) includes accessing photograph (258) in local application (120) of mobile device (112). This accessing of photograph (258) may include manually confirming photograph (258) after capturing photograph (258) and prior to removing rectilinear boxes (40). Optionally, this step may be omitted. FIG. 12 shows an interface of local application (120) for displaying captured photograph (258) of physical scorecard (10). As shown in FIG. 12, if photograph (258) is acceptable, the user may proceed by indicating acceptance (e.g., clicking a checkmark icon (260)). Conversely, if photograph (258) is unacceptable, the user may repeat step (214) one or more times by indicating rejection (e.g., by clicking a repeat icon (262)) and repeating step (214) until photograph (258) is acceptable.

At step (218), method (200) includes transferring photograph (258) from local application (120) to cloud-based application (122) using network (124) that connects local application (120) with the cloud-based application (122). Performing certain steps using cloud-based application (122) may accelerate the processing time and result in an enhanced user experience. Additionally, using cloud-based application (122) may provide additional consistency/accuracy (e.g., due to mobile devices having different hardware configurations) when used in various platforms (e.g., iOS, Android). Using cloud-based application (122) may reduce the effect of updates and different hardware configurations. Transferring photograph (258) to/from local application (120) to a cloud-based application (122) using network (124) may be omitted, if desired. As a result, method (200) may be performed using local application (120). At step (220), method (200) includes identifying rectilinear boxes (40) using cloud-based application (122) by using the color contrast between the rectilinear boxes (40) and printed characters (36) of physical scorecard (10) from photograph (258) and the color of background (44) of photograph (258) of physical scorecard (10). Identifying rectilinear boxes (40) may include identifying straight lines (48) and/or right angles (42) of physical scorecard (10) to enhance the subsequent removal of rectilinear boxes (40) from background (44) of photograph (258). At step (222), method (200)

includes isolating rectilinear boxes (40) using cloud-based application (122) after rectilinear boxes (40) are identified.

At step (224), method (200) includes removing rectilinear boxes (40) using cloud-based application (114). Cloud-based application (122) manipulates photograph (254) for extraction of printed characters (36) and handwritten characters (38) and to reduce noise. Straight lines (48) and/or right angles (42) allow for isolation and removal from to from also high-contrast printed characters (36) and handwritten characters (38) of physical scorecard (10). This ensures cloud-based application (122) only subsequently removes rectilinear boxes (40) and not printed characters (36) and handwritten characters (38) of physical scorecard (10). Cloud-based application (122) does not use the grid lines forming rectilinear boxes (40) to separate photograph (258) into several components to then read the components individually and reconstruct photograph (258) later. By not using gridlines to bound contents of printed characters (36) and handwritten characters (38), cloud-based application (122) is able to more quickly and accurately process photograph (258). Since handwritten characters may occasionally cross into adjacent rectilinear boxes (40) and negatively affect the accuracy of the text extraction, cloud-based application (122) first removes these rectilinear boxes (40) to instead read the characters as a continuous horizontal paragraph.

At step (226), method (200) includes extracting at least handwritten characters (38) from physical scorecard (10) using cloud-based application (122) by reading at least handwritten characters (38) from photograph (258) as a single paragraph after removing the rectilinear boxes (40). In other words, cloud-based application (122) reads entire physical scorecard (10) as a continuous paragraph. In some versions, both printed characters (36) and handwritten characters (38) from physical scorecard (10) may be extracted by cloud-based application (122). Printed characters (36) and handwritten characters (38) may include numeric values. Cloud-based application (122) may use computer vision/machine learning to identify handwritten characters (38) written down on physical scorecard (10) from photograph (258). For example, cloud-based application (120) may use a model trained on previously identified handwritten characters (e.g., a reference data set) to identify handwritten characters (38). Cloud-based application (122) converts printed characters (36) and handwritten characters (38) from photograph (258) into a machine-readable format for subsequent calculation.

At step (227), method (200) includes transferring at least extracted handwritten characters (38) from cloud-based application (122) to local application (120). In some versions, extracted characters may include printed characters (36) and handwritten characters (38) from physical scorecard (10).

At step (228), method (200) includes local application (120) breaking the paragraph into one or more arrays using predetermined criterion (e.g., the player's names) as a breaking point. The handwritten name is matched to the typed name (from step (210)). For example, player 1 data may form a first array, player 2 data may form a second array, player 3 data may form a third array, and player 4 data may form a fourth array.

At step (229), method (200) includes local application (120) removing blank spaces and predetermined characters from the array(s). These predetermined characters may include string characters that are not letters (e.g., commas, dashes, and other non-letter characters). In other words, local application (120) trims and strips the array(s). As a result, at least handwritten characters (38) remain in the array(s). In some versions, at least some of printed characters (36) also remain in the array(s).

At step (230), method (200) includes local application (120) separating at least handwritten characters (38) of the array(s) into predetermined slots corresponding to the number of holes (e.g., 9 holes or 18 holes). For example, step (230) may separate printed characters (36) and handwritten characters (38) of the array(s) into predetermined slots corresponding to the number of holes.

At step (232), method (200) includes inserting extracted handwritten characters into predetermined slots corresponding to the number of holes after separating at least handwritten characters into predetermined slots corresponding to the number of holes provided at step (210). For example, 9 predetermined slots correspond to the 9 holes initially entered in step (210). Alternatively, 18 predetermined slots correspond to the 18 holes initially entered in step (210). However, other numbers of predetermined slots are also envisioned and may vary depending on the application (e.g., pilot logbooks or trucker's logbooks).

At step (234), method (200) includes calculating a score for the round of golf using the extracted handwritten characters (38) on local application (120) after transferring extracted handwritten characters (38). A calculation module may sum the parsed text based on the game chosen at step (210) (e.g., 9 holes or 18 holes). The individual hole scores are added (4+3+6+5+6+6+4+3+4) for the first 9 holes and (5+4+4+3+4+4+4+5+4) for the second 9 holes.

Figure 13:
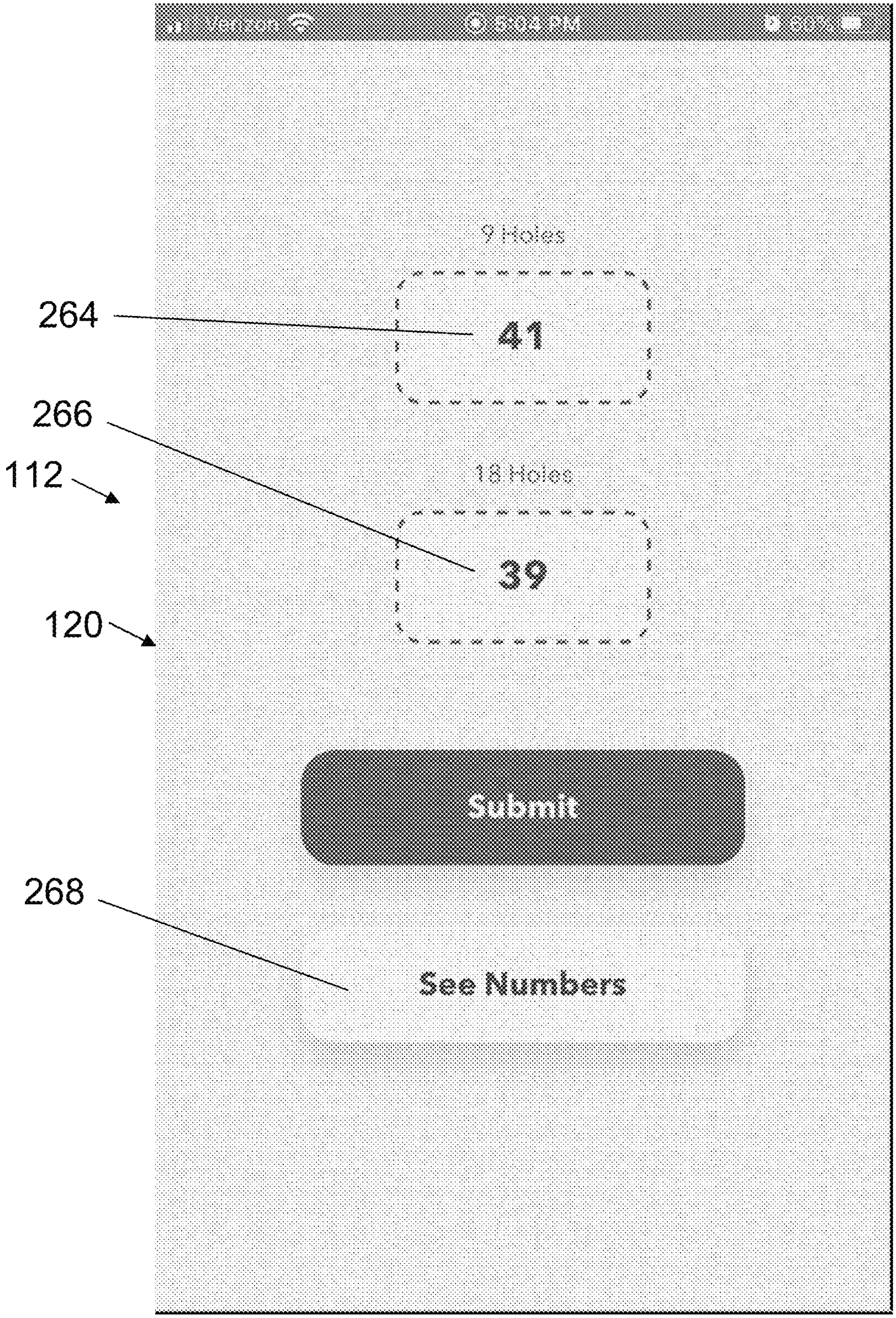
FIG. 13 depicts an interface for displaying a summation of the parsed characters.

At step (236), method (200) includes displaying a summation (264) for the first 9 holes and displaying a summation (266) for the second 9 holes. In some versions, a user's score may be displayed adjacent the respective player's name after calculating the score. FIG. 13 shows an interface of local application (120) for displaying summations (264, 266) of the parsed characters. A single summation (not shown) may also be shown for the entire round (e.g., 41+39=80) if 18 holes are recorded on physical scorecard (10).

At step (238), user determines whether summations (264, 266) of the score were expected. If yes, the score was expected, scores of additional players may be determined at step (242) For example, this additional score may pertain to player 2 (30), player 3 (32), and/or player 4 (34). These steps (212, 214, 216, 218, 220, 222, 224, 226, 227, 228, 229, 230, 232, 234, 236, 238) may be repeated for each individual score at step (240). For example, scores of player 2 (30), player 3 (32), and/or player 4 (34) may be determined using steps (212, 214, 216, 218, 220, 222, 224, 226, 227, 228, 229, 230, 232, 234, 236, 238) as described above. Since summations (264, 266) and the overall score are in machine readable form, summations (264, 266) and/or the overall score may be exported to other programs and/or shared among players.

Additionally, the user may enter additional physical scorecards by completing steps (210, 212, 214, 216, 218, 220, 222, 224, 226, 227, 228, 229, 230, 232, 234, 236, 238) as described above. For example, local application (120) may return to step (210) where data is input into local application (120). Optionally, once additional physical scorecards are completed, data may be compiled to produce a leaderboard at step (242). This may be beneficial when multiple scorecards have to be compiled in a short amount of time. For example, golf outings and tournaments may find this feature beneficial.

Figure 14:
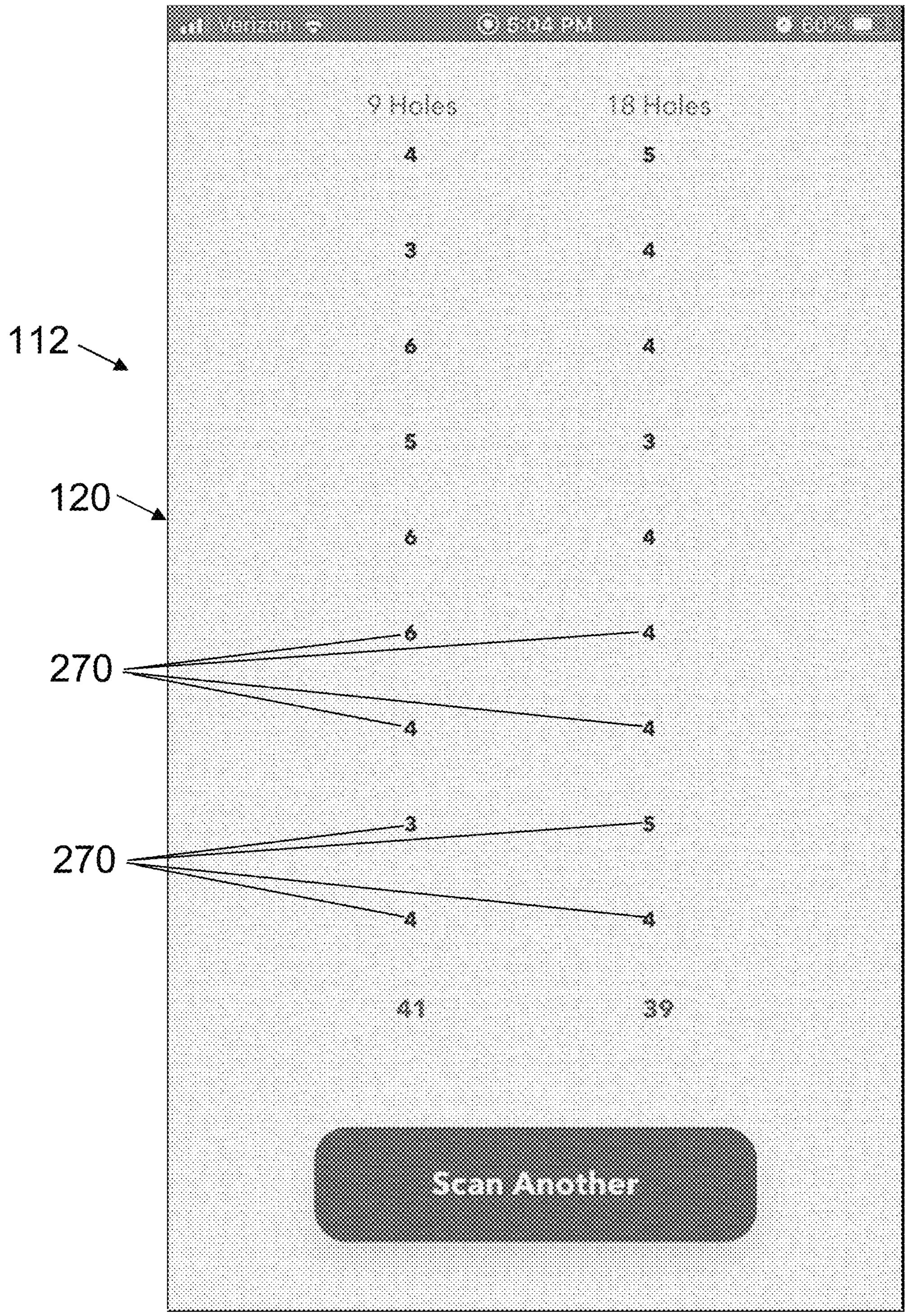
FIG. 14 depicts an interface for displaying the individual parsed characters that form the summation of FIG. 13.

At step (244), method (200) may optionally include displaying individual parsed characters (270) corresponding to the individual extracted handwritten characters (38) used for the calculating step for manual verification by clicking "See Numbers (268)" in FIG. 13. This may be beneficial if the calculated score was unexpected. FIG. 14 shows an interface of local application (120) for displaying the individual parsed characters (270) that form summations (264, 266) of FIG. 13. At step (246), method (200) may optionally include altering individual parsed characters (270) corresponding to the individual extracted handwritten characters (38) used for the calculating step. After altering individual parsed characters (270), method (200) may continue to step (240) to continue to an additional player. Since summations (264, 266) and the overall score are in machine readable form, summations (264, 266) and/or the overall score may be exported to other programs and/or shared among players.

II. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A method to score a round of golf using a golf scoring system, the method comprising: (a) capturing a photograph of a physical scorecard including handwritten text using a camera of a user device, wherein the physical scorecard includes handwritten characters disposed at least partially within rectilinear boxes; (b) accessing the photograph in an application of the user device; (c) identifying the rectilinear boxes by using a color contrast between the rectilinear boxes of the physical scorecard and a background color of the physical scorecard; (d) removing the rectilinear boxes; (e) after removing the rectilinear boxes, extracting at least the handwritten characters from the physical scorecard; and (f) after extracting at least the handwritten characters, calculating a score of the round of golf using the extracted handwritten characters on the application.

Example 2

The method of Example 1, further comprising: (a) after accessing the photograph, transferring the photograph from the application to a cloud-based application using a network that connects the application with the cloud-based application; and (b) after extracting the handwritten characters and before calculating the score, transferring the extracted handwritten characters to the application to calculate the score on the application.

Example 3

The method of Example 2, wherein identifying the rectilinear boxes and removing the rectilinear boxes are performed the cloud-based application to improve processing speed.

Example 4

The method of any one or more of Examples 1 through 3, further comprising prior to capturing the photograph, indicating a number of holes using the application.

Example 5

The method of Example 4, further comprising after extracting at least the handwritten characters, inserting the extracted handwritten characters into predetermined slots corresponding to the number of holes.

Example 6

The method of any one or more of Examples 1 through 5, wherein the user device includes an electronic keyboard, wherein the method further comprises prior to capturing the photograph, manually entering into the application at least one player's name using the electronic keyboard.

Example 7

The method of Example 6, further comprising after calculating the score, displaying the score adjacent the respective player's name

Example 8

The method of any one or more of Examples 1 through 7, further comprising after capturing the photograph and prior to removing the rectilinear boxes, manually confirming the photograph.

Example 9

The method of any one or more of Examples 1 through 8, wherein prior to capturing the photograph, the method further comprises indicating at least an outer periphery of the sensed physical scorecard.

Example 10

The method of any one or more of Examples 1 through 9, wherein capturing the photograph further comprising isolating the physical scorecard from a background of photograph.

Example 11

The method of any one or more of Examples 1 through 10, further comprising manipulating the photograph for extraction of the handwritten characters and to reduce noise.

Example 12

The method of any one or more of Examples 1 through 11, wherein the rectilinear boxes are formed by straight lines that intersect at right angles, wherein identifying the rectilinear boxes further comprises identifying the straight lines and the right angles to enhance removing the rectilinear boxes.

Example 13

The method of any one or more of Examples 1 through 12, wherein extracting the handwritten characters further comprises extracting the handwritten characters from the physical scorecard by reading the handwritten characters as a single paragraph from left to right.

Example 14

The method of any one or more of Examples 1 through 13, further comprising displaying individual extracted handwritten characters used for the calculating step for manual verification.

Example 15

The method of any one or more of Examples 1 through 14, wherein the user device is a smartphone, wherein the application is a smartphone-based application.

Example 16

A method to score a round of golf using a golf scoring system, the method comprising: (a) capturing a photograph of a physical scorecard including handwritten text using a camera of a smartphone, wherein the physical scorecard includes handwritten characters disposed at least partially within rectilinear boxes; (b) accessing the photograph in a smartphone-based application of the smartphone; (c) transferring the photograph from a smartphone-based application to a cloud-based application using a network that connects the smartphone-based application with the cloud-based application; (d) identifying the rectilinear boxes using the cloud-based application by using a color contrast between the rectilinear boxes of the physical scorecard and a background color of the physical scorecard; (e) removing the rectilinear boxes using the cloud-based application; (f) after removing the rectilinear boxes, extracting at least the handwritten characters from the physical scorecard by reading at least the handwritten characters as a single paragraph; (g) transferring at least the extracted handwritten characters to the smartphone-based application; and (h) after transferring the extracted handwritten characters, calculating a score of the round of golf using the extracted handwritten characters on the smartphone-based application.

Example 17

The method of Example 16, further comprising manipulating the photograph for extraction of the handwritten characters and to reduce noise.

Example 18

The method of any one or more of Examples 16 through 17, wherein the rectilinear boxes are formed by straight lines that intersect at right angles, wherein identifying the rectilinear boxes further comprises identifying the straight lines and the right angles to enhance removing the rectilinear boxes.

Example 19

The method of any one or more of Examples 16 through 18, wherein the extracted handwritten characters are numeric values.

Example 20

A golf scoring system comprising: (a) a physical scorecard that includes handwritten characters disposed within rectilinear boxes; (b) a user device comprising: (i) a camera, and (ii) an application; wherein the golf scoring system is configured to: (a) capture a photograph of the physical scorecard including handwritten text using the camera of the user device, wherein the physical scorecard includes handwritten characters disposed at least partially within rectilinear boxes; (b) access the photograph in the application of the user device, (c) identify the rectilinear boxes by using a color contrast between the rectilinear boxes of the physical scorecard and a background color of the physical scorecard, (d) remove the rectilinear boxes, (e) after removing the rectilinear boxes, extract at least the handwritten characters from the physical scorecard, and (f) after extracting at least the handwritten characters, calculate a score of the round of golf using the extracted handwritten characters on the application.

III. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention.

Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A method to score a round of golf using a golf scoring system, the method comprising:

(a) manually handwriting characters, including a plurality of individual hole scores of the round of golf, at least partially within rectilinear boxes of a physical scorecard;

(b) capturing a photograph of the physical scorecard including the handwritten characters using a camera of a user device of a user;

(c) accessing the photograph in an application of the user device using the golf scoring system;

(d) identifying the rectilinear boxes by using a contrast between the rectilinear boxes of the physical scorecard and a background of the physical scorecard;

(e) removing the rectilinear boxes without removing the handwritten characters;

(f) after removing the rectilinear boxes, extracting at least the handwritten characters from the physical scorecard by reading the handwritten characters as a single continuous paragraph;

(g) after extracting at least the handwritten characters by reading the handwritten characters as the single continuous paragraph, calculating a score of the round of golf using the extracted handwritten characters on the application using the golf scoring system; and (h) after calculating the score, transmitting the score to the user using the application.

2. The method of claim 1, further comprising:

(a) after accessing the photograph, transferring the photograph from the application to a cloud-based application using a network that connects the application with the cloud-based application; and (b) after extracting the handwritten characters and before calculating the score, transferring the extracted handwritten characters to the application to calculate the score on the application.

3. The method of claim 2, wherein identifying the rectilinear boxes and removing the rectilinear boxes are performed on the cloud-based application to improve processing speed.

4. The method of claim 1, further comprising prior to capturing the photograph, indicating a number of holes using the application.

5. The method of claim 4, further comprising after extracting at least the handwritten characters, inserting the extracted handwritten characters into predetermined slots corresponding to the number of holes.

6. The method of claim 1, wherein the user device includes an electronic keyboard, wherein the method further comprises prior to capturing the photograph, manually entering at least one player's name into the application using the electronic keyboard.

7. The method of claim 6, further comprising after transmitting the score to the user, displaying the score adjacent the respective player's name.

8. The method of claim 1, wherein prior to capturing the photograph, the method further comprises visually indicating to the user at least an outer periphery of the sensed physical scorecard of a target area to be captured.

9. The method of claim 1, wherein capturing the photograph further comprising isolating the physical scorecard from a background of photograph.

10. The method of claim 1, wherein the rectilinear boxes are formed by straight lines that intersect at right angles, wherein identifying the rectilinear boxes further comprises identifying the straight lines and the right angles to enhance removing the rectilinear boxes.

11. The method of claim 1, wherein the user device is a smartphone, wherein the application is a smartphone-based application.

12. The method of claim 1, wherein the extracting further comprises extracting at least the handwritten characters from the physical scorecard by reading the handwritten characters from left to right as the single continuous paragraph without using the rectilinear boxes to separate the photograph into components.

13. A golf scoring system comprising:

(a) a physical scorecard that includes handwritten characters disposed within rectilinear boxes, wherein the rectilinear boxes are formed by straight lines that intersect at right angles; and (b) a user device comprising:

(i) a camera, and (ii) an application;

wherein the golf scoring system is configured to:

(a) capture a photograph of the physical scorecard including the handwritten characters using the camera of the user device, (b) access the photograph in the application of the user device using the golf scoring system, (c) identify the rectilinear boxes based on at least one of straight lines or right angles using a contrast between the straight lines and the right angles of the rectilinear boxes of the physical scorecard and a background of the physical scorecard, (d) remove the rectilinear boxes without removing the handwritten characters, (e) extract at least the handwritten characters from the physical scorecard by reading the handwritten as a single continuous paragraph after removing the rectilinear boxes, (f) calculate a score of the round of golf using the extracted handwritten characters on the application using the golf scoring system after extracting at least the handwritten characters by reading the handwritten as a single continuous paragraph, and (g) transmit the score to the user using the application after calculating the score.

14. The golf scoring system of claim 13, wherein the golf scoring system is further configured to manipulate the photograph for extraction of the handwritten characters and to reduce noise.

15. The golf scoring system of claim 13, wherein the rectilinear boxes are formed by the straight lines that intersect at the right angles, wherein identifying the rectilinear boxes further comprises identifying the straight lines and the right angles to enhance removing the rectilinear boxes.

16. The golf scoring system of claim 13, wherein the golf scoring system is configured extract at least the handwritten characters from the physical scorecard by reading the handwritten as the single continuous paragraph without using the rectilinear boxes to separate the photograph into components.

17. A golf scoring system comprising:

(a) a physical scorecard that includes handwritten characters disposed within rectilinear boxes, wherein the rectilinear boxes are formed by straight lines that intersect at right angles; and (b) a user device comprising an application;

wherein the golf scoring system is configured to:

(a) access a photograph of the physical scorecard, wherein the photograph of the physical scorecard includes handwritten characters disposed at least partially within rectilinear boxes of the physical scorecard, (b) identify the rectilinear boxes by using a contrast between the rectilinear boxes of the physical scorecard and a background of the physical scorecard, (c) after identifying the rectilinear boxes by using the contrast, remove the rectilinear boxes without removing the handwritten characters, (d) after removing the rectilinear boxes, extract at least the handwritten characters from the physical scorecard by reading the handwritten characters as a single continuous paragraph, and (e) calculate a score of the round of golf using the extracted handwritten characters on the application after extracting at least the handwritten characters by reading the handwritten characters as the single continuous paragraph.

18. The golf scoring system of claim 17, wherein user device includes a camera, wherein the photograph of the physical scorecard includes handwritten characters disposed at least partially within rectilinear boxes of the physical scorecard using the camera of the user device.

19. The golf scoring system of claim 17, wherein the golf scoring system is configured to transmit the score to the user using the application after calculating the score of the round of golf.

20. The golf scoring system of claim 17, wherein the golf scoring system is configured to:

(a) extract at least the handwritten characters from the physical scorecard by reading the handwritten characters as a single continuous paragraph after removing the rectilinear boxes, break the single continuous paragraph into one array per player after extracting at least the handwritten characters by reading the handwritten characters as the single continuous paragraph, and (b) calculate a score for each player of the round of golf using the extracted handwritten characters on the application.

* * * * *